United States Patent
Olvera-Hernandez et al.

(10) Patent No.: US 8,219,091 B2
(45) Date of Patent: Jul. 10, 2012

(54) WIRELESS COMMUNICATION METHOD AND SYSTEM FOR CONVEYING MEDIA INDEPENDENT HANDOVER CAPABILITY INFORMATION

(75) Inventors: Ulises Olvera-Hernandez, Kirkland (CA); Alan Gerald Carlton, Mineola, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 608 days.

(21) Appl. No.: 11/373,926

(22) Filed: Mar. 13, 2006

(65) Prior Publication Data

US 2006/0251020 A1 Nov. 9, 2006

Related U.S. Application Data

(60) Provisional application No. 60/661,379, filed on Mar. 14, 2005.

(51) Int. Cl.
*H04W 36/00* (2009.01)

(52) U.S. Cl. .................. 455/436; 455/414.1; 455/432.1; 455/435.1; 455/435.2; 455/437; 455/438; 455/444

(58) Field of Classification Search .................. 455/436, 455/414.1, 432.1, 435.1, 435.2, 437, 438, 455/444
See application file for complete search history.

(56) References Cited

U.S. PATENT DOCUMENTS

| | | | | |
|---|---|---|---|---|
| 5,027,316 A | * | 6/1991 | Frantz et al. | 710/11 |
| 6,061,362 A | * | 5/2000 | Muller et al. | 370/463 |
| 6,985,465 B2 | * | 1/2006 | Cervello et al. | 370/333 |
| 6,987,985 B2 | * | 1/2006 | Purkayastha et al. | 455/552.1 |
| 7,016,325 B2 | * | 3/2006 | Beasley et al. | 370/331 |
| 7,031,280 B2 | * | 4/2006 | Segal | 370/331 |
| 7,106,714 B2 | * | 9/2006 | Spear et al. | 370/336 |
| 7,483,984 B1 | | 1/2009 | Jonker et al. | |
| 2002/0060995 A1 | * | 5/2002 | Cervello et al. | 370/332 |
| 2002/0071404 A1 | * | 6/2002 | Park et al. | 370/331 |
| 2002/0072382 A1 | * | 6/2002 | Fong et al. | 455/507 |
| 2002/0188723 A1 | * | 12/2002 | Choi et al. | 709/225 |
| 2003/0007490 A1 | * | 1/2003 | Yi et al. | 370/394 |

(Continued)

FOREIGN PATENT DOCUMENTS

WO 2005/008630 1/2005

OTHER PUBLICATIONS 802.11 Working Group of the LAN/MAN Committee, "IEEE P802.11s/D0.01 Draft Amendment to Standard for Information Technology—Telecommunications and Information Exchange Between Systems—LAN/MAN Specific Requirements—Part 11: Wireless Medium Access Control (MAC) and Physical Layer (PHY) Specifications: Amendment: ESS Mesh Networking", IEEE P802.11s/D0.01, (Mar. 2006).

(Continued)

*Primary Examiner* — Kwasi Karikari
(74) *Attorney, Agent, or Firm* — Volpe and Koenig, P.C.

(57) ABSTRACT

A method and system for conveying media independent handover (MIH) capability information are disclosed. A wireless communication system includes a plurality of wireless networks deployed under different wireless communication protocols. A multi-mode wireless transmit/receive unit (WTRU) may perform a handover from one wireless network to another for continuous reception of services. The wireless network sends a message to the WTRU which indicates whether the wireless network supports MIH services and a supported MIH mode. The WTRU receives the message and makes a handover decision based on the message.

16 Claims, 4 Drawing Sheets

U.S. PATENT DOCUMENTS

| | | | |
|---|---|---|---|
| 2003/0117978 A1* | 6/2003 | Haddad | 370/331 |
| 2003/0133421 A1* | 7/2003 | Sundar et al. | 370/328 |
| 2003/0193911 A1* | 10/2003 | Zhao et al. | 370/331 |
| 2004/0013102 A1* | 1/2004 | Fong et al. | 370/345 |
| 2004/0029587 A1* | 2/2004 | Hulkkonen et al. | 455/436 |
| 2004/0062426 A1 | 4/2004 | Lo | |
| 2004/0063426 A1 | 4/2004 | Hunkeler | |
| 2004/0102194 A1* | 5/2004 | Naghian et al. | 455/436 |
| 2004/0116120 A1* | 6/2004 | Gallagher et al. | 455/436 |
| 2004/0147223 A1* | 7/2004 | Cho | 455/41.2 |
| 2004/0165594 A1* | 8/2004 | Faccin et al. | 370/395.2 |
| 2004/0185852 A1 | 9/2004 | Son et al. | |
| 2004/0185853 A1 | 9/2004 | Kim et al. | |
| 2004/0202141 A1* | 10/2004 | Sinivaara et al. | 370/338 |
| 2005/0018637 A1* | 1/2005 | Karoubalis et al. | 370/338 |
| 2005/0083971 A1* | 4/2005 | Delaney et al. | 370/466 |
| 2005/0157673 A1* | 7/2005 | Verma et al. | 370/328 |
| 2005/0165917 A1* | 7/2005 | Le et al. | 709/220 |
| 2005/0185619 A1* | 8/2005 | Niemela et al. | 370/331 |
| 2005/0243755 A1* | 11/2005 | Stephens | 370/328 |
| 2005/0249161 A1* | 11/2005 | Carlton | 370/331 |
| 2006/0099948 A1* | 5/2006 | Hoghooghi et al. | 455/436 |
| 2006/0099949 A1 | 5/2006 | Jung et al. | |
| 2006/0187858 A1* | 8/2006 | Kenichi et al. | 370/254 |
| 2006/0217147 A1 | 9/2006 | Olvera-Hernandez et al. | |

OTHER PUBLICATIONS

IEEE 802 Committee of the IEEE Computer Society, "Draft Amendment to Standard for Information Technology—Telecommunications and Information Exchange Between Systems—LANn/MAN Specific Requirements—Part 11: Wireless Medium. Access Control (MAC) and Physical Layer (PHY) Specifications, Amendment 9: Radio Resource Measurement", IEEE P802.11k/D3.5, (Mar. 2006).

IEEE 802 Committee of the IEEE Computer Society, "IEEE P802.11/D0.01 Draft Amendment to Standard for Information Technology—Telecommunications and Information Exchange Between Systems—LAN/MAN Specific Requirements—Part 11:. Wireless Medium Access Control (MAC) and Physical Layer (PHY) Specifications, Amendment v: Wireless Network Management", IEEE P802.11/D0.01, (Jan. 2006).

802.11 Working Group of the 802 Committee, "IEEE P802.11n/D0.01 Draft Amendment to Standard [for] Information Technology—Telecommunications and Information Exchange Between Systems—Local and Metropolitan Networks—Specific Requirements— Part 11: Wireless LAN Medium Access Control (MAC) and Physical Layer (PHY) Specifications: Enhancements for Higher Throughput", IEEE P802.11n/D0.01, (Jan. 2006).

IEEE 802 Committee of the IEEE Computer Society, "Draft Amendment to Standard for Information Technology—Telecommunications and Information Exchange Between Systems—LAN/MAN Specific Requirements— Part 11: Wireless Medium Access Control (MAC) and Physical Layer (PHY) Specifications, Amendment 9: Radio Resource Measurement", IEEE P802.11103.5, (Mar. 2006).

IEEE 802 Committee of the IEEE Computer Society, "IEEE P802.11/00.01 Draft Amendment to Standard for Information Technology—Telecommunications and Information Exchange Between Systems—LAN/MAN Specific Requirements—Part 11: Wireless Medium Access Control (MAC) and Physical Layer (PHY) Specifications, Amendment v: Wireless Network Management", IEEE P802.11/D0.01, (Jan. 2006).

Joint Harmonized Contribution, "Media Independent Handover," IEEE 802.21 Media Independent Handover Services, 21-05-0240-01-0000—Joint_Harmonized_MIH_Proposal_Draft_Text (May 2005).

LAN MAN Standards Committee of the IEEE Computer Society, "IEEE P802.21/001.00 Draft IEEE Standard for Local and Metropolitan Area Networks: Media Independent Handover Services", IEEE P802.21/D01.00, (Mar. 2006).

802.11 Working Group of the 802 Committee, "IEEE P802.11n/D0.01 Draft Amendment To Standard [For] Information Technology—Telecommunications And Information Exchange Between Systems—Local And Metropolitan Networks—Specific Requirements—Part 11: Wireless LAN Medium Access Control (MAC) And Physical Layer (PHY) Specifications: Enhancements For Higher Throughput", IEEE P802.11n/D0.01, (Jan. 2006).

802.11 Working Group of the LAN/MAN Committee, "IEEE P802.11s/D0.01 Draft Amendment To Standard For Information Technology—Telecommunications And Information Exchange Between Systems—LAN/MAN Specific Requirements—Part 11: Wireless Medium Access Control (MAC) And Physical Layer (PHY) Specifications: Amendment: ESS Mesh Networking", IEEE P802.11s/D0.01, (Mar. 2006).

Faccin et al., "Nokia MIH Proposal," IEEE 802.21 Media Independent Handover, 21-04-0169-02-0000 (Jan. 10, 2004).

Hoghooghi et al., "Optimal Beacon & Architecture for MIH," IEEE 802.21 Media Independent Handover, DCN: IEEE802.21-04-0164-02-0021 (Jan. 10, 2005).

IEEE 802 Committee of the IEEE Computer Society, "Draft Amendment To Standard For Information Technology—Telecommunications And Information Exchange Between Systems—LAN/MAN Specific Requirements—Part 11: Wireless Medium Access Control (MAC) And Physical Layer (PHY) Specifications: Amendment 8: Fast BSS Transition", IEEE P802.11r/D0.09, (Sep. 2005).

IEEE 802 Committee of the IEEE Computer Society, "Draft Amendment to Standard for Information Technology—Telecommunications And Information Exchange Between Systems—LAN/MAN Specific Requirements—Part 11: Wireless Medium Access Control (MAC) And Physical Layer (PHY) Specifications, Amendment 7: Radio Resource Measurement", IEEE P802.11k/D1.0, (Jul. 2004).

IEEE 802 Committee of the IEEE Computer Society, "Draft Amendment To Standard for Information Technology—Telecommunications And Information Exchange Between Systems—LAN/MAN Specific Requirements—Part 11: Wireless Medium Access Control (MAC) And Physical Layer (PHY) Specifications, Amendment 9: Radio Resource Measurement", IEEE P802.11k/D3.5, (Mar. 2006).

IEEE 802 Committee of the IEEE Computer Society, "IEEE P802.11/D0.01 Draft Amendment To Standard For Information Technology—Telecommunications And Information Exchange Between Systems—LAN/MAN Specific Requirements—Part 11: Wireless Medium Access Control (MAC) And Physical Layer (PHY) Specifications, Amendment v: Wireless Network Management", IEEE P802.11/D0.01, (Jan. 2006).

IEEE Computer Society and the IEEE Microwave Theory and Techniques Society, "802.16, IEEE Standard for Local and metropolitan area networksl Part 16: Air Interface for Fixed Broadband Wireless Access Systems," IEEE Std 802.16-2004 (Oct. 2004).

Joint Harmonized Contribution, "Media Independent Handover," IEEE 802.21 Media Independent Handover Services, 21-05-0240-01-0000-Joint_Harmonized_MIH_Proposal_Draft_Text (May 2005).

LAN MAN Standards Committee of the IEEE Computer Society, "IEEE P802.21/D01.00 Draft IEEE Standard For Local And Metropolitan Area Networks: Media Independent Handover Services", IEEE P802.21/D01.00, (Mar. 2006).

* cited by examiner

| | B7 | B6 | B5 | B4 | B3 | B2 | B1 | B0 |
|---|---|---|---|---|---|---|---|---|
| NO MIH SUPPORT | 0 | 0 | 0 | 0 | 0 | 0 | 0 | 0 |
| MIH SUPPORT, INFORMATION SERVICE IS DELIVERED OVER ETHERNET (WIRED OR WIRELESS) | 0 | 0 | 0 | 0 | 0 | 0 | 0 | 1 |
| MIH SUPPORT, INFORMATION SERVICE IS DELIVERED OVER AN IP NETWORK | 0 | 0 | 0 | 0 | 0 | 0 | 1 | 1 |
| CELLULAR INTEGRATION SUPPORT | 0 | 0 | 0 | 0 | 0 | 1 | X | 1 |
| 802.16 SUPPORT | 0 | 0 | 0 | 0 | 1 | X | X | 1 |
| OTHER CAPABILITIES | | | | | | | | |
| .. | | | | | | | | |
| .. | | | | | | | | |
| | | | | | | | | |

*FIG. 4*

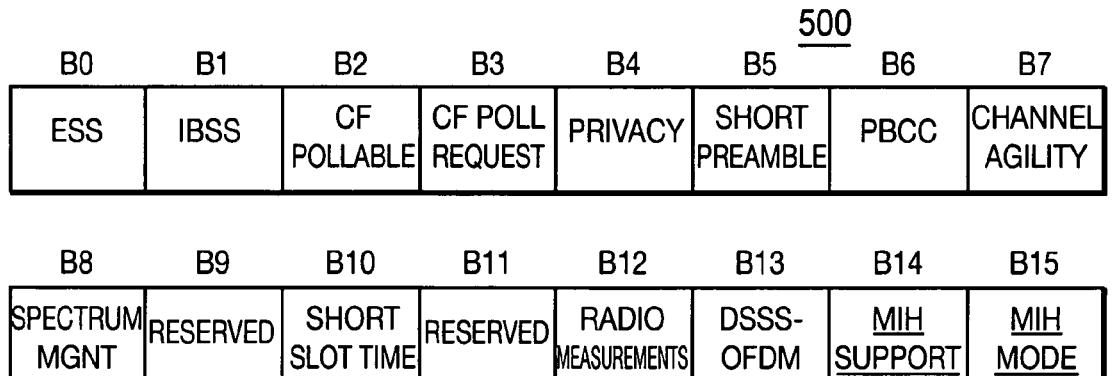

*FIG. 5*

| TYPE | LENGTH | VALUE | SCOPE |
|---|---|---|---|
| MIH SUPPORT | 1 | BIT # 0 RESERVED<br>BIT # 1 = '0' NO MIH SUPPORT<br>BIT # 1 = '1': MIH SUPPORT<br>BIT # 2 = '0': ETHERNET TRANSPORT<br>BIT # 2 = '1': IP TRANSPORT | SBC-REQ<br>SBC-RSP |

*FIG. 6*

WIRELESS COMMUNICATION METHOD AND SYSTEM FOR CONVEYING MEDIA INDEPENDENT HANDOVER CAPABILITY INFORMATION

CROSS REFERENCE TO RELATED APPLICATION

This application claims the benefit of U.S. provisional application No. 60/661,379 filed Mar. 14, 2005, which is incorporated by reference as if fully set forth.

FIELD OF INVENTION

The present invention is related to wireless communication systems. More particularly, the present invention is related to a method and system for conveying media independent handover (MIH) capability information.

BACKGROUND

Currently, many different types of wireless networks are deployed, which provide specific services that each wireless network is intended for. For example, wireless local area networks (WLANs), such as IEEE 802.xx based networks, provide high data rate services in a limited coverage area while cellular networks, such as universal mobile telecommunication system (UMTS) networks, provide relatively low to medium data rate services in a very large coverage area supporting high speed mobility.

IEEE 802.21 MIH has been proposed for a seamless handover among these heterogeneous networks enabling continuous reception of services while roaming around these heterogeneous networks. However, MIH may not be supported by all networks and the supported MIH mode may vary from network to network. Therefore, it would be desirable to provide wireless transmit/receive unit (WTRU) MIH capability information, (e.g., including whether a wireless network supports MIH and, if it is supported, what mode of MIH is supported).

SUMMARY

The present invention is related to a method and system for conveying MIH capability information. A wireless communication system includes a plurality of wireless networks deployed under different wireless communication protocols. A multi-mode WTRU may perform a handover from one wireless network to another for continuous reception of services. The wireless network sends a message to the WTRU which indicates whether the wireless network supports MIH services and a supported MIH mode. The WTRU receives the message and makes a handover decision based on the message.

BRIEF DESCRIPTION OF THE DRAWINGS

A more detailed understanding of the invention may be had from the following description of a preferred embodiment, given by way of example and to be understood in conjunction with the accompanying drawings wherein:

FIG. 4 shows an exemplary bit map for conveying MIH capability information using a full octet in accordance with the present invention;

FIG. 5 shows an exemplary bit map for conveying MIH capability information in a capability information field of a beacon frame in accordance with the present invention;

FIG. 6 shows an exemplary bit map for conveying MIH capability information in accordance with the present invention.

DETAILED DESCRIPTION OF THE PREFERRED EMBODIMENTS

Hereafter, the terminology "WTRU" includes but is not limited to a user equipment, a mobile station, a fixed or mobile subscriber unit, a pager, or any other type of device capable of operating in a wireless environment. When referred to hereafter, the terminology "base station" and access point (AP) includes but is not limited to a Node-B, a site controller or any other type of interfacing device in a wireless environment.

The features of the present invention may be incorporated into an integrated circuit (IC) or be configured in a circuit comprising a multitude of interconnecting components.

Figure 1:
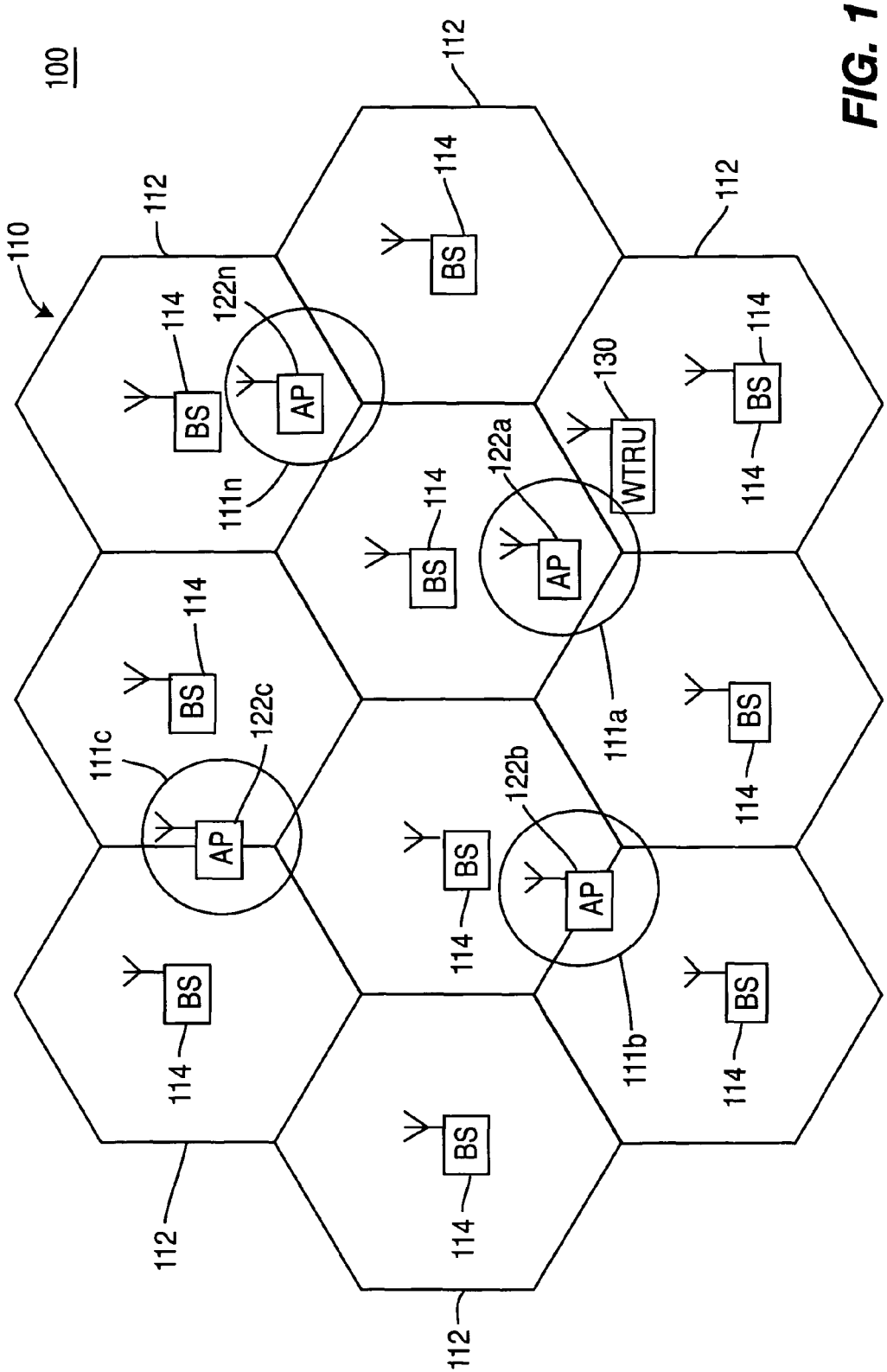
FIG. 1 shows an exemplary wireless communication system configured in accordance with the present invention.

FIG. 1 shows an exemplary wireless communication system 100 configured in accordance with the present invention. The system 100 includes a plurality of wireless networks 110 and 111a-111n that are concurrently deployed under different wireless communication standards and provide specific services in specific coverage areas which may or may not overlap each other. For example, the system 100 may include a cellular network 110 and a plurality of wireless local area networks 111a-111n. The cellular network 110 may be third generation partnership (3GPP) networks or 3GPP2 networks, and the wireless local area networks 111a-111n maybe IEEE 802 based networks, (such as 802.11 baseline, 802.11a, 802.11b, 802.11g, 802.11j, 802.11n, 802.11e, 802.11s, 802.11k, 802.11v, 802.15, 802.16 and 802.21 networks), Bluetooth™ networks, HIPERLAN/2, or any other type of networks. The cellular network 110 includes a plurality of cells 112, each of which is covered by a base station 114. The WLANs 111a-111n are served by APs 122a-122n, respectively.

As a WTRU 130 roams around an area where a plurality of heterogeneous networks 110 and 111a-111n, (e.g., cellular networks and WLANs), are concurrently deployed, the WTRU 130 needs to determine, quickly, the most suitable network based on requirements of the service requested by the user. For example, a video application may require a high bandwidth channel, while a voice application may be sufficient with a low bandwidth channel. The speed at which the WTRU 130 can find a suitable network depends on its ability to retrieve network information from available networks.

In accordance with the present invention, the networks 110 and 111a-111n convey MIH capability information to the WTRU 130 preferably via a broadcast channel. The MIH capability information may be transmitted over either a wired or wireless medium. The MIH capability information indicates not only whether the network support MIH services but also the supported MIH mode. MIH services include information service, event service and command service for conveying handover related information, events and command. The supported MIH mode indicates MIH functionality supported by the network. With these two pieces of information, the WTRU 130 can make a more intelligent decision with regards to whether or not the particular network should be considered for handover.

Figure 2:
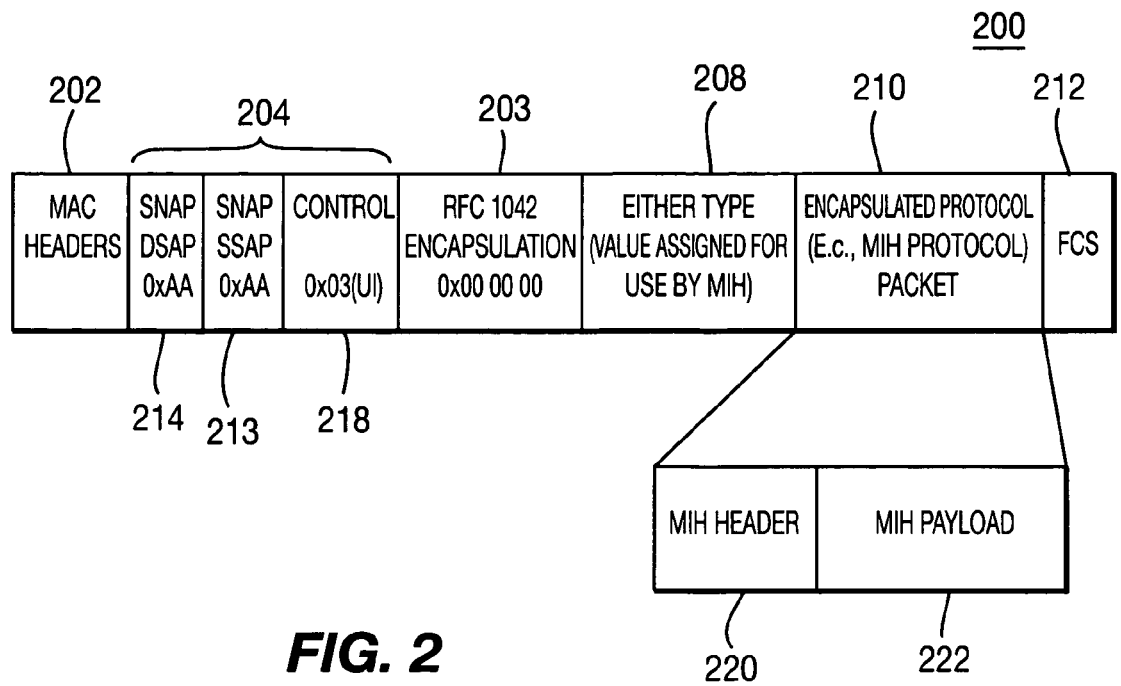
FIG. 2 shows a medium access control (MAC) protocol data unit (PDU) with logical link control (LLC) encapsulation for conveying MIH services in accordance with the present invention.

For example, the MIH services may be provided either over layer 2 (L2) procedures and messages or over layer 3 (L3) procedures and messages, (such as Internet protocol (IP)). FIG. 2 shows a MAC PDU 200 with LLC encapsulation for conveying MIH services in accordance with the present invention. The MAC PDU 200 includes MAC headers 202, an LLC header 204, an RFC 1042 encapsulation 206, an Either Type field 208, a frame body 210 and a frame check sequence (FCS) field 212. The LLC header 204 includes a sub-network access protocol (SNAP) destination service access point (DSAP) field 214, an SNAP source service access point (SSAP) field 216 and a control field 218. The RFC 1042 encapsulation 206 and the Either Type field 208 are used for carrying IP datagram over IEEE 802 networks. The MIH protocol used for the provision of MIH services can be carried over a L2 transport using an LLC encapsulation by defining a new Ether Type 208 that uniquely identifies the MIH protocol. An MIH header 220 and an MIH payload 222 are included in the frame body 210.

Figure 3:
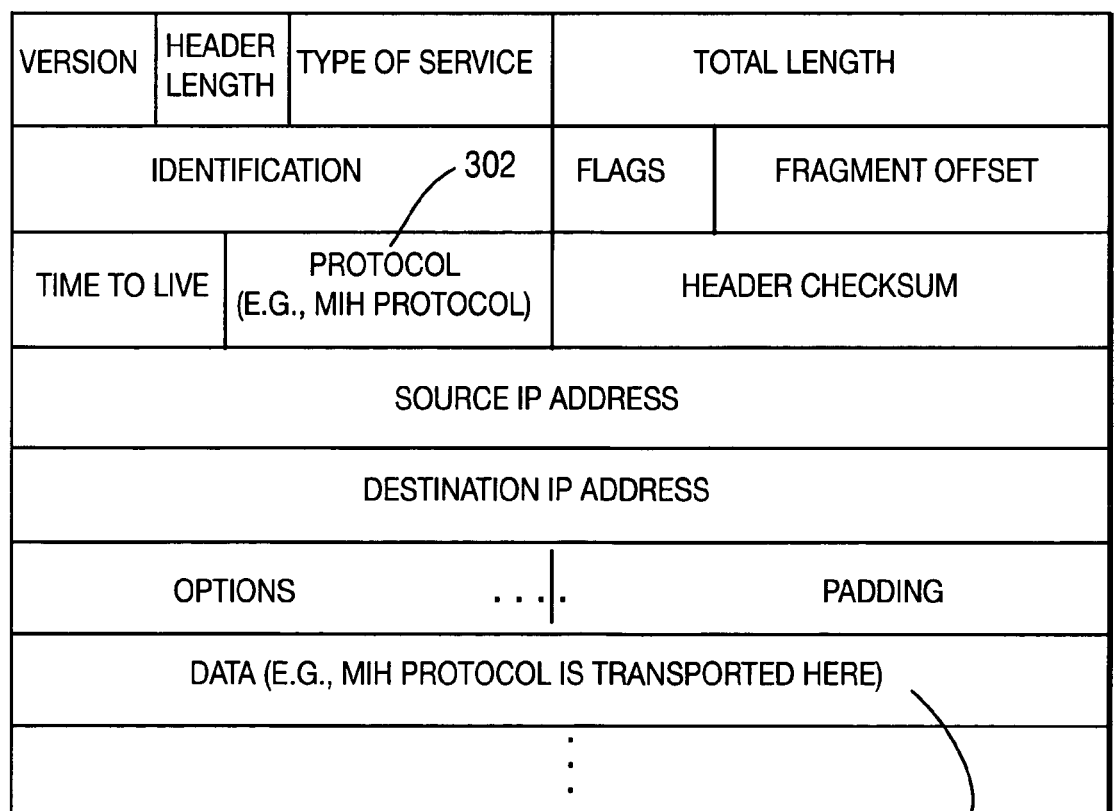
FIG. 3 shows an IP frame for conveying MIH services in accordance with the present invention.

Alternatively, a higher layer protocol such as IP may be used to achieve similar results. FIG. 3 shows an IP frame 300 for conveying MIH services in accordance with the present invention. MIH services are transported over an IP frame by defining a new Protocol ID 302 and encapsulating the MIH protocol within a data field 304 of the IP frame 300.

The present invention provides the WTRU with a means to determine which transport method is supported in a particular network. This information is provided through the MIH mode parameter.

Since there is not much available space on current broadcast channels, minimum number of bits, preferably two bits, should be used to convey MIH capability information. A simple bit map provides the WTRU 130 with a quick indication of the capabilities of the networks 110 and 111*a*-111*n* with regards to MIH functionality. If more space is available, more information may be provided using more bits, (e.g., a full octet), as shown in FIG. 4.

Exemplary bit maps using two bits, B0 and B1, are explained hereinafter. A combination of two bits indicates whether the network 110 and 111*a*-111*n* supports MIH services and the supported MIH mode. For example, if B1='0' and B0='0', this indicates that the network 110 and 111*a*-111*n* does not provide any MIH services. However, in such case, the WTRU 130 may still be able to obtain MIH services over and an IP connection. If B1='0' and B0='1', this indicates that the network 110 and 111*a*-111*n* provides some MIH services, and information services may be accessed over L2 procedures over an Ethernet connection, (such as shown in FIG. 2), without having to rely on IP connectivity. If B1='1' and B0='1', this indicates that the network 110 and 111*a*-111*n* provides MIH services, and information service is accessible over both L2 procedures and L3 procedures over an IP connection, (such as shown in FIG. 3). If B1='1' and B0='0', this indicates that the network 110 and 111*a*-111*n* provides some MIH services, (i.e., command and event services), but information service may only be accessed over L3 procedures (i.e., via an IP connection).

FIG. 5 shows an exemplary bit map for conveying MIH capability information in a capability information field 500 of a beacon frame in an IEEE 802.11 network in accordance with the present invention. In this example, an MIH support bit 502 and an MIH mode bit 504 are added in the capability field 500 of the beacon frame. B0 and B1 of the foregoing example are replaced with the MIH support bit 502 and the MIH mode bit 504, respectively.

FIG. 6 shows an exemplary bit map for conveying MIH capability information in an IEEE 802.16 network in accordance with the present invention. IEEE 802.16 defines a set of medium access control (MAC) management messages including a subscriber station (SS) basic capability request (SBC-REQ) message and an SS basic capability response (SBC-RSP) message. The SBC-REQ and SBC-RSP messages are exchanged between a WTRU and a network during initialization. A WTRU generates the SBC-REQ message and sends it to the network. The WTRU includes supported physical parameters and bandwidth allocation in the SBC-REQ message. The network sends the SBC-RSP message in response to the SBC-REQ message. The network responds to the subset of the capabilities present in the SBC-REQ message indicating whether they may be used.

In accordance with the present invention, a new MAC management message type for SBC-REQ and SBC-RSP messages is defined for MIH support. FIG. 6 shows an exemplary IEEE 802.16 bit map for this purpose. Bit #0 is reserved. Bit #1 set to '0' indicates no MIH is supported by the network and bit #1 set to '1' indicates MIH services are supported by the network. Bit #2 set to '0' indicates MIH information is accessible over Ethernet transport and bit #2 set to '1' indicates MIH information is accessible over IP transport. Other bits may be used to convey other capability information.

Referring again to FIG. 4, an exemplary bit map for conveying MIH capability information using a full octet in accordance with the present invention is shown. A first bit, B0, indicates whether the network supports MIH services, (i.e., if B0='1', this indicates that the network supports MIH services, and if B0='0', this indicates that the network does not support MIH services). If the network supports MIH services, (i.e., B0='1'), then additional bits, (in the example of FIG. 4, seven (7) bits, B1-B7), provide further information with regards to the capability of the network to deliver these services. If B1='0', this indicates that MIH services are available without the need to contact a separate network entity over IP. If B1='1', this indicates that the network does not support MIH services, (particularly, information services), over L2 procedures, and therefore the WTRU is required to contact an information server over an L3 transport. If B2 is set, (i.e., B2='1'), this indicates that the network provides cellular integration support and if B3 is set, (i.e., B3='1'), this indicates that the network provides IEEE 802.16 support. Other capability information may be provided in a similar manner.

It should be noted that the bit maps shown in FIGS. 4-6 are provided as an example, not as a limitation and any variation is possible.

Figure 7:
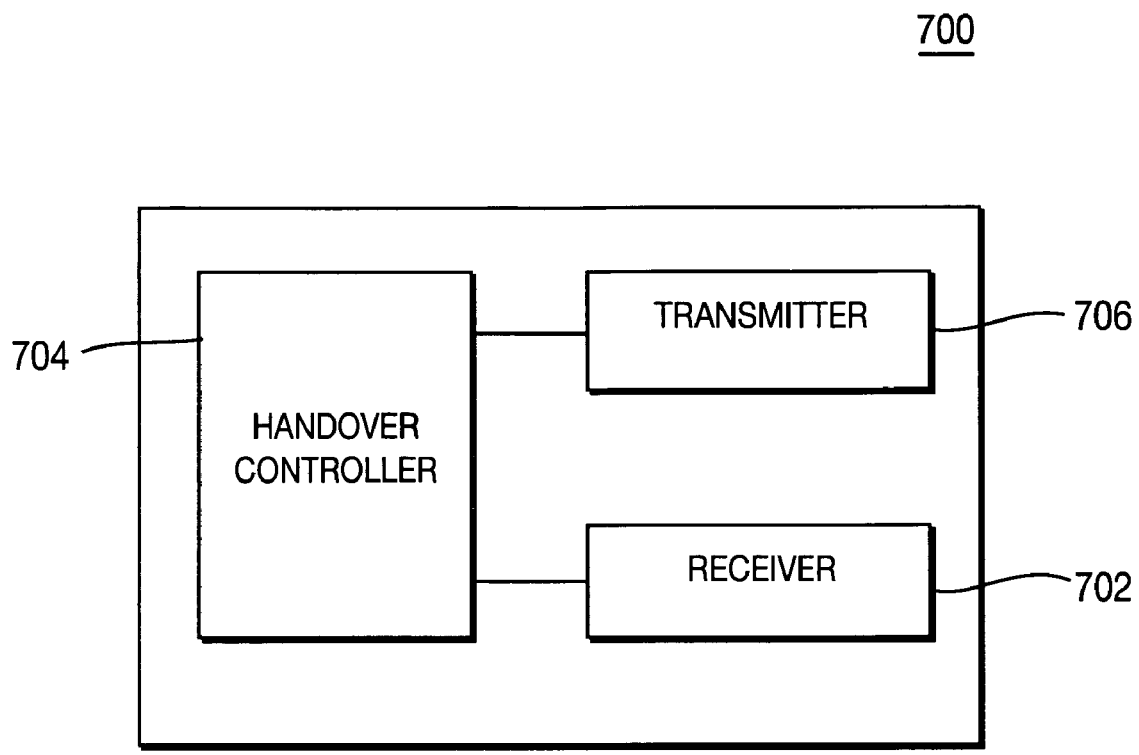
FIG. 7 is a block diagram of a WTRU in accordance with the present invention.

FIG. 7 is a block diagram of a WTRU 700 in accordance with the present invention. The WTRU 700 includes a receiver 702 and a handover controller 704. The receiver 702 is configured to receive a message transmitted from a network. The handover controller 704 is configured to extract MIH information from the message. The MIH information indicates whether the wireless network supports MIH services and a supported MIH mode as described hereinbefore. The handover controller 704 then performs a handover based on the MIH information. The WTRU 700 may further comprise a transmitter 706 configured to send a request to the network to request the message, whereby the message may be sent in response to the request.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for use in a wireless transmit/receive unit (WTRU), the method comprising:
generating an IEEE 802.16 subscriber station (SS) basic capability request (SBC-REQ) message including a first IEEE 802.21 media independent handover (MIH) support parameter comprising a first two or more bits indicating supported MIH capabilities of the WTRU;
transmitting the SBC-REQ message to a base station;
receiving a SS basic capability response (SBC-RSP) message from the base station in response to the SBC-REQ message, wherein the SBC-RSP message includes a second IEEE 802.21 MIH support parameter comprising a second two or more bits indicating supported MIH capabilities of the base station; and
associating with the base station based on the received SBC-RSP message;
wherein the second two or more bits indicate whether the base station supports an IEEE 802.21 MIH information service, whether the base station supports an IEEE 802.21 MIH command service, or whether the base station supports an IEEE 802.21 MIH event service.

2. The method of claim 1 wherein on a condition that a first bit of the second two or more bits is set to "1" IEEE 802.21 MIH is supported.

3. The method of claim 1 wherein on a condition that a first bit of the second two or more bits is set to "0" IEEE 802.21 MIH is not supported.

4. The method of claim 1 wherein the SBC-REQ and SBC-RSP messages are IEEE 802.16 medium access control (MAC) management messages.

5. A wireless transmit/receive unit (WTRU), the WTRU comprising:
a controller configured to generate an IEEE 802.16 subscriber station (SS) basic capability request (SBC-REQ) message, wherein the SBC-REQ message includes a first IEEE 802.21 media independent handover (MIH) support parameter comprising a first two or more bits indicating supported MIH capabilities;
a transmitter configured to transmit the SBC-REQ message to a base station;
a receiver configured to receive a SS basic capability response (SBC-RSP) message from the base station in response to the SBC-REQ message, wherein the SBC-RSP message includes a second IEEE 802.21 MIH support parameter comprising a second two or more bits indicating supported MIH capabilities; and
wherein the controller is further configured to associate with the base station based on the received SBC-RSP message;
wherein the second two or more bits indicate whether the base station supports an IEEE 802.21 MIH information service, whether the base station supports an IEEE 802.21 MIH command service, or whether the base station supports an IEEE 802.21 MIH event service.

6. The WTRU of claim 5 wherein on a condition that a first bit of the second two or more bits is set to "1" IEEE 802.21 MIH is supported.

7. The WTRU of claim 5 wherein on a condition that a first bit of the second two or more bits is set to "0" IEEE 802.21 MIH is not supported.

8. The WTRU of claim 5 wherein the SBC-REQ and SBC-RSP messages are IEEE 802.16 medium access control (MAC) management messages.

9. A method for use in a base station, the method comprising:
receiving an IEEE 802.16 subscriber station (SS) basic capability request (SBC-REQ) message including a first IEEE 802.21 media independent handover (MIH) support parameter comprising a first two or more bits indicating supported MIH capabilities of a wireless transmit/receive unit (WTRU);
generating a SS basic capability response (SBC-RSP) message in response to the SBC-REQ message, wherein the SBC-RSP message includes a second IEEE 802.21 MIH support parameter comprising a second two or more bits indicating supported MIH capabilities; and
transmitting the SBC-RSP message;
wherein the second two or more bits may be used to indicate whether the base station supports an IEEE 802.21 MIH information service, whether the base station supports an IEEE 802.21 MIH command service, or whether the base station supports an IEEE 802.21 MIH event service.

10. The method of claim 9 wherein on a condition that a first bit of the second two or more bits is set to "1" IEEE 802.21 MIH is supported.

11. The method of claim 9 wherein on a condition that a first bit of the second two or more bits is set to "0" IEEE 802.21 MIH is not supported.

12. The method of claim 9 wherein the SBC-REQ and SBC-RSP messages are IEEE 802.16 medium access control (MAC) management messages.

13. A base station, the base station comprising:
a receiver configured to receive an IEEE 802.16 subscriber station (SS) basic capability request (SBC-REQ) message including a first IEEE 802.21 media independent handover (MIH) support parameter comprising a first two or more bits indicating supported MIH capabilities of a wireless transmit/receive unit (WTRU);
a controller configured to generate a SS basic capability response (SBC-RSP) message in response to the SBC-REQ message, wherein the SBC-RSP message includes a second IEEE 802.21 MIH support parameter comprising a second two or more bits indicating supported MIH capabilities; and
a transmitter configured to transmit the SBC-RSP message
wherein the second two or more bits may be used to indicate whether the base station supports an IEEE 802.21 MIH information service, whether the base station supports an IEEE 802.21 MIH command service, or whether the base station supports an IEEE 802.21 MIH event service.

14. The base station of claim 13 wherein on a condition that a first bit of the second two or more bits is set to "1" IEEE 802.21 MIH is supported.

15. The base station of claim 13 wherein on a condition that a first bit of the second two or more bits is set to "0" IEEE 802.21 MIH is not supported.

16. The base station of claim 13 wherein the SBC-REQ and SBC-RSP messages are IEEE 802.16 medium access control (MAC) management messages.

* * * * *

UNITED STATES PATENT AND TRADEMARK OFFICE
CERTIFICATE OF CORRECTION

PATENT NO. : 8,219,091 B2  
APPLICATION NO. : 11/373926  
DATED : July 10, 2012  
INVENTOR(S) : Olvera-Hernandez et al.

Page 1 of 1

It is certified that error appears in the above-identified patent and that said Letters Patent is hereby corrected as shown below:

ON THE TITLE PAGE

At Item (56) OTHER PUBLICATIONS, page 2, left column, line 53, after "Radio Resource Measurement", IEEE", delete "P802.11103.5" and insert --P802.11k/D3.5--.

At Item (56) OTHER PUBLICATIONS, page 2, right column, line 2, after "IEEE", delete "P802.21/001.00" and insert --P802.21/D01.00--.

Signed and Sealed this  
Twelfth Day of March, 2013

Teresa Stanek Rea  
*Acting Director of the United States Patent and Trademark Office*